Nov. 30, 1954  W. G. STOECKICHT  2,695,697
BRAKING AND COUPLING DEVICE ACTUATED BY A LIQUID
UNDER PRESSURE OR COMPRESSED AIR
Filed Feb. 28, 1951  3 Sheets-Sheet 3
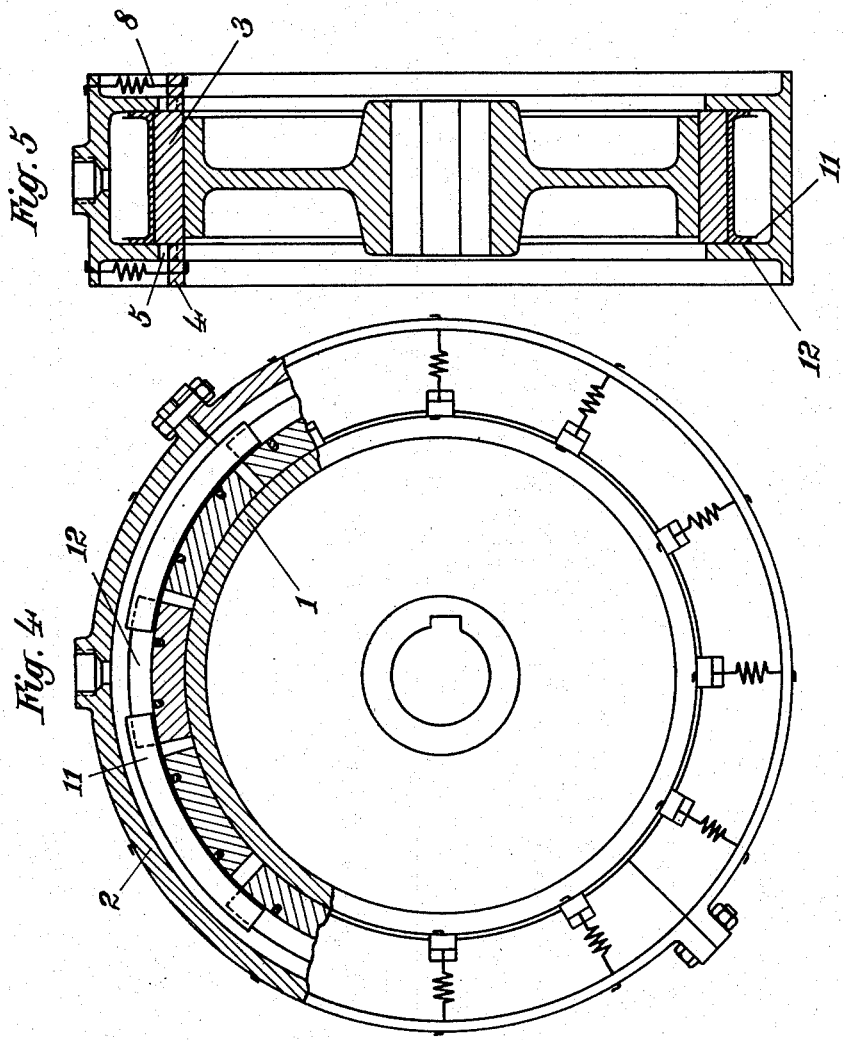
Inventor:
Wilhelm G. Stoeckicht.
BY
Hauser, Dickey & Pierce
Attorney

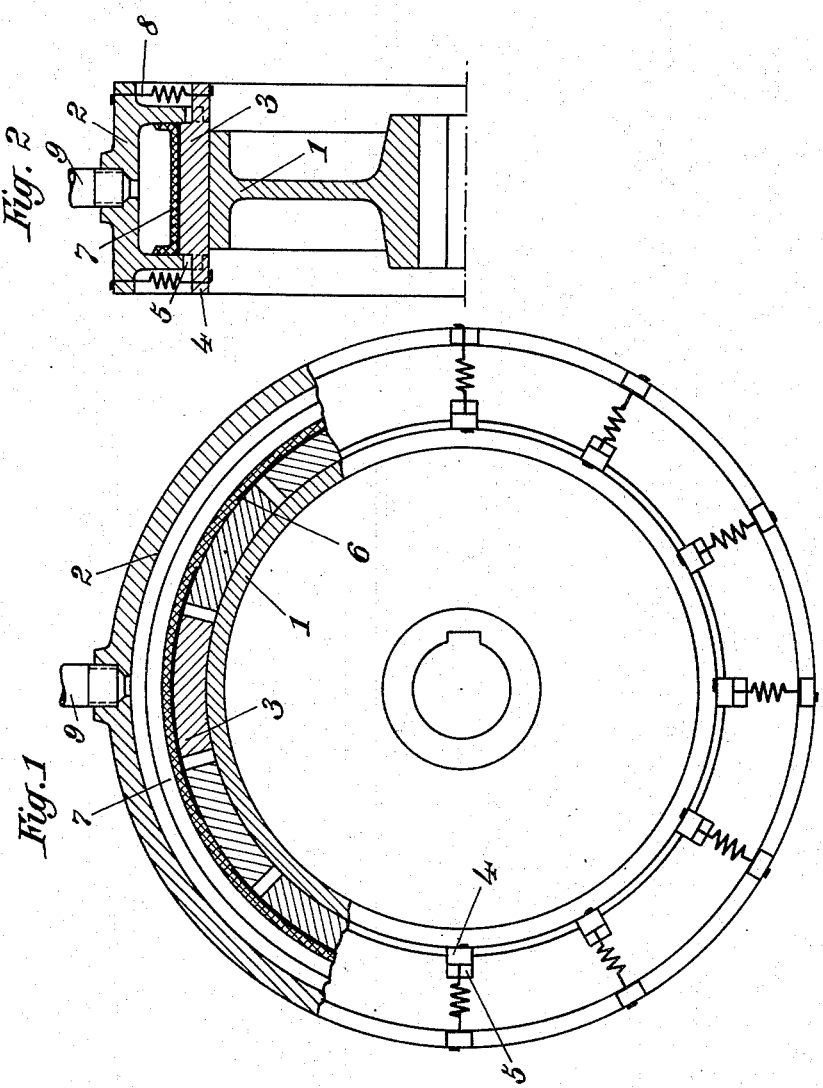

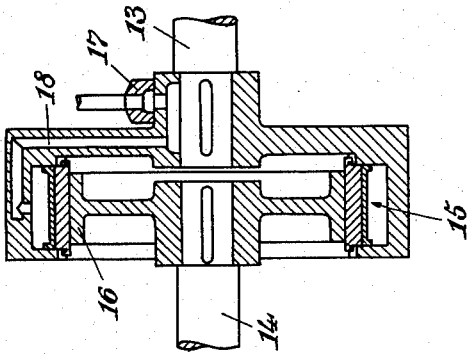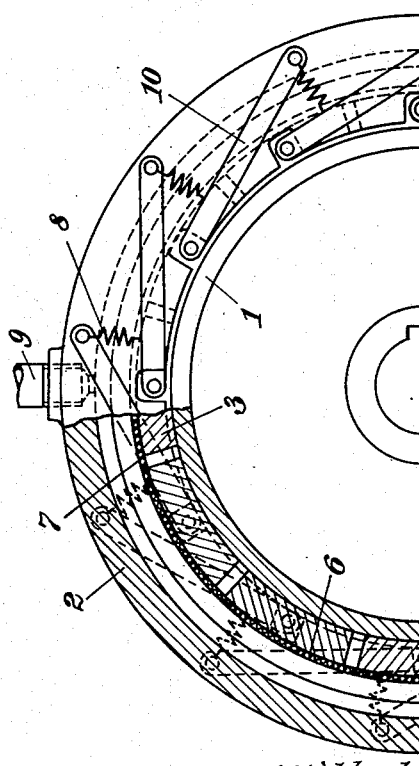

United States Patent Office 2,695,697
Patented Nov. 30, 1954

2,695,697

BRAKING AND COUPLING DEVICE ACTUATED BY A LIQUID UNDER PRESSURE OR COMPRESSED AIR

Wilhelm G. Stoeckicht, Munich-Solln, Germany

Application February 28, 1951, Serial No. 213,236

Claims priority, application Germany March 28, 1950

5 Claims. (Cl. 192—88)

When brakes are employed, for instance in planet wheel change speed and reversing gears, and in other spheres of application as well, it has been found to be of advantage to use brakes which not only exert no kind of transverse forces on the machine part to be braked, but are also capable of adapting themselves to slight changes of shape of the machine part and of equalising errors due to faulty assembly.

The invention relates to particularly simple and advantageous novel arrangement for such a brake which is actuated by liquid or pneumatic pressure. According to the invention the brake is so constructed that it consists of a brake casing with a considerable number of brake blocks, of which each is independently displaceable radially in the brake casing and which enclose a common pressure liquid space.

Fig. 1 is a brake wherein the brake blocks are guided in radial slots.

Fig. 2 is a sectional view of Fig. 1.

Fig. 3 is a brake with a different way of guiding the brake blocks.

Fig. 4 is a brake wherein the elastic packing ring has been omitted.

Fig. 5 is a sectional view of the brake of Fig. 4.

Fig. 6 is a view showing the invention applied to a clutch.

The accompanying drawings show two constructional forms of the invention. In Figures 1 and 2 the wheel to be braked bears the reference 1; it is surrounded by the brake casing 2 with is of U-shaped cross-section and contains a number of brake blocks 3, in the present example twelve, which with lugs or projections 4 are radially displaceable in radial slots or grooves 5 of the brake casing 2. Between the brake blocks 3 small gaps are provided, so that they can be displaced radially inwards without impeding each other. These gaps are covered by metal sheets 6. The brake blocks 3 are surrounded by an elastic packing ring 7 which seals the annular pressure space of the brake casing 2. The brake blocks 3 are also urged outwardly by spring elements 8. The annular pressure space of the brake casing 2 can be charged with liquid under pressure or compressed air by way of a supply pipe 9.

In Figure 3 another possible way of guiding the brake blocks 3 is illustrated. In this case the blocks are not guided in radial slots, but are pivotally attached to the brake casing 2 by means of straps 10 at both sides. Figures 4 and 5 show a further constructional form for the tight jointing of the annular pressure space in the brake casing 2. In place of the annular packing ring 7 the brake blocks 3 are in this case provided alternately with shield segments of soft sheet metal 11 and 12, the shield segments 12 overlapping the shield segments 11. The shield segments 11 and 12 are preferably made of soft sheet metal which under the liquid pressure bears with a sealing action against the casing walls. In cases where a particularly effective sealing action is required, the shield segments 12 which overlap the sheet metal segments 11 will preferably be made of a yielding packing material, such for instance as leather, rubber or similar materials.

Through this division of the packing elements it becomes possible to have a divided brake casing (2), so that the brake can be dismantled by itself. This is of great importance in many cases. Figure 4 shows how the brake casing (2) is divided.

The mode of operation is as follows: when the brake is to be put in action, the annular pressure space of the brake casing 2 is filled with liquid under pressure; by this means the brake blocks 3 are pressed radially inwards against the wheel 1 to be braked. The peripheral force to be taken up is transmitted by each individual brake block 3 by way of the projections 4 and the slots 5 or by way of the pivoted straps 10 to the brake casing 2. As all the brake blocks are forced inwards with the same pressure and the peripheral force is taken off uniformly over the entire periphery, no transverse forces are exerted on the wheel 1 which is to be braked. Moreover, the mobility of the individual brake blocks enables them to adapt themselves to any temporary or permanent changes of shape of the part 1 to be braked.

The construction shown in Figures 4 and 5 is particularly suitable for cases in which the special working conditions, such as the occurrence of fairly high temperatures, do not permit of the use of an elastic packing ring 7.

In the illustrations constructional forms of the invention are illustrated, in which the part to be braked is surrounded by the braking device. The invention can of course also be applied in the case of brakes, with which the braking device lies within the part to be braked; in this case the brake blocks are forced radially outwards by the pressure liquid.

The device can also be provided on rotating parts, in which case it acts as a coupling device. Figure 6 shows in section an arrangement, in which the two shafts 13 and 14 are to be coupled to one another. In the case shown the shaft 13 carries the coupling device 15 which is constructed in the same manner as the brake device illustrated in Figures 1 and 2. The coupling disc 16 mounted on the shaft 14 is surrounded by the coupling device 15. On the shaft 13 an oil or air supply bush 17 is provided, which is connected by way of bores 18 with the pressure space of the coupling device 15, so that this pressure space can be filled with pressure liquid or compressed air. The way in which the device functions is fundamentally the same as described in connection with the brake device according to Figures 1 and 2, the only difference being that in this case the parts rotate.

What I claim is:

1. In combination, two relatively rotatable structures concentric with each other, one of said structures having a frictional engaging surface and the other comprising a plurality of circumferentially spaced friction blocks adapted to engage said frictional engaging surface, resilient means for retracting said friction blocks from the frictional engagement with said frictional engaging surface, a casing structure, an annular chamber in said casing structure for receiving said friction blocks, means for supporting said friction blocks in said casing structure for enabling substantially radial movement of each of said blocks with respect to the rotary axis of said relatively rotatable structures, means for connecting said annular chamber with a fluid pressure supply, and sealing means for connecting said annular chamber and said friction blocks, said sealing means comprising a plurality of segmental sealing members of U-shaped cross-section, the ends of which overlap, said segmental sealing members being made of soft material.

2. The combination as claimed in claim 1, said segmental sealing members being made of soft sheet metal.

3. The combination as claimed in claim 1, said segmental sealing members being alternately of yielding packing material and of soft sheet metal.

4. The combination as claimed in claim 1, said casing structure being formed of two parts divided along an axial plane.

5. In combination, two relatively rotatable structures concentric with each other, one of said structures having a frictional engaging surface and the other comprising a plurality of circumferentially spaced friction blocks adapted to engage said frictional engaging surface, resilient means for retracting said friction blocks from the frictional engagement with said frictional engaging surface, a casing structure, an annular chamber in said casing structure for receiving said friction blocks, means for supporting said friction blocks in said casing structure for enabling substantially radial movement of each of said blocks with respect to the rotary axis of said relatively rotatable structures, means for connecting said annular chamber with a fluid pressure supply, and sealing means for connecting said annular chamber and said friction blocks, said sealing means comprising a plurality of segmental sealing members corresponding in number to said friction blocks and being of U-shaped cross-section, each of said sealing members being placed adjacent one of said sealing blocks, the ends of adjacent sealing members being in overlapping relation, said sealing members being formed of soft sheet metal and being relatively movable in both a circumferential and a radial direction.

References Cited in the file of this patent

UNITED STATES PATENTS

| Number | Name | Date |
|---|---|---|
| 633,385 | Mann | Sept. 19, 1899 |
| 1,047,713 | Smith | Dec. 17, 1912 |
| 2,055,325 | Woolson | Sept. 22, 1936 |
| 2,349,494 | Fawick | May 23, 1944 |
| 2,400,586 | Zimmermann | May 21, 1946 |
| 2,422,227 | Fawick | June 17, 1947 |
| 2,499,585 | Hollerith | Mar. 7, 1950 |
| 2,612,909 | Keller | Oct. 7, 1952 |

FOREIGN PATENTS

| Number | Country | Date |
|---|---|---|
| 15,302 | Great Britain | July 29, 1901 |
| 222,029 | Great Britain | Sept. 25, 1924 |
| 593,078 | Great Britain | Oct. 8, 1947 |